(12) United States Patent
Jung et al.

(10) Patent No.: US 8,015,553 B2
(45) Date of Patent: Sep. 6, 2011

(54) METHOD AND APPARATUS FOR TESTING EXECUTION FLOW OF PROGRAM

(75) Inventors: Myung-june Jung, Suwon-si (KR);
Hyun-jin Choi, Gangnam-gu (KR);
Kyung-im Jung, Seongnam-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1059 days.

(21) Appl. No.: 11/655,925

(22) Filed: Jan. 22, 2007

(65) Prior Publication Data

US 2007/0220351 A1  Sep. 20, 2007

(30) Foreign Application Priority Data

Feb. 17, 2006  (KR) .................. 10-2006-0015708

(51) Int. Cl.
*G06F 9/44* (2006.01)
(52) U.S. Cl. .................. 717/132; 717/127
(58) Field of Classification Search ........... 717/124–133
See application file for complete search history.

(56) References Cited

U.S. PATENT DOCUMENTS

| 5,974,529 | A | 10/1999 | Zumkehr et al. | |
| 6,880,149 | B2 * | 4/2005 | Cronce .................. | 717/126 |
| 2004/0228481 | A1 | 11/2004 | Crispin et al. | |

FOREIGN PATENT DOCUMENTS

| JP | 05-233346 A | 9/1993 |
| JP | 09-244912 A | 9/1997 |
| JP | 2002-149444 A | 5/2002 |
| JP | 2003-316604 A | 7/2003 |
| KR | 2000-0075835 A1 | 12/2000 |
| WO | WO 98/38575 A1 | 9/1998 |

OTHER PUBLICATIONS

Dearborn Group Technology, "Data Link Monitor DLM Software—User's Manual", 1999, Dearborn Group Inc., http://www.dgtech.com, pp. 1-22.*
Definition from Whatis.com, "Checksum", Jul. 24, 2001, http://searchsecurity.techtarget.com/, 2 pages.*
Wilken, K., et al., "Concurrent Detection of Software and Hardware Data-Access Faults", IEEE Transactions on Computers, Apr. 1997, pp. 412-424, vol. 46, No. 4, XP 002559451.
"Longitudinal Redundancy Check Checking of Instruction Flow", IBM Technical Disclosure Bulletin, Jul. 1988, pp. 71-76, vol. 31, No. 2, XP 000715691.
Joseph, M., et al., "A Fault Tolerance Approach to Computer Viruses", Security and Privacy, 1988, pp. 52-58, XP 010012325.

* cited by examiner

*Primary Examiner* — Ted T Vo
(74) *Attorney, Agent, or Firm* — Sughrue Mion, PLLC

(57) ABSTRACT

A method and apparatus for testing an execution flow of a program are provided. The method includes measuring the execution flow that reflects instruction values constituting the program and an execution order of the instructions; and verifying the measured execution flow.

20 Claims, 17 Drawing Sheets

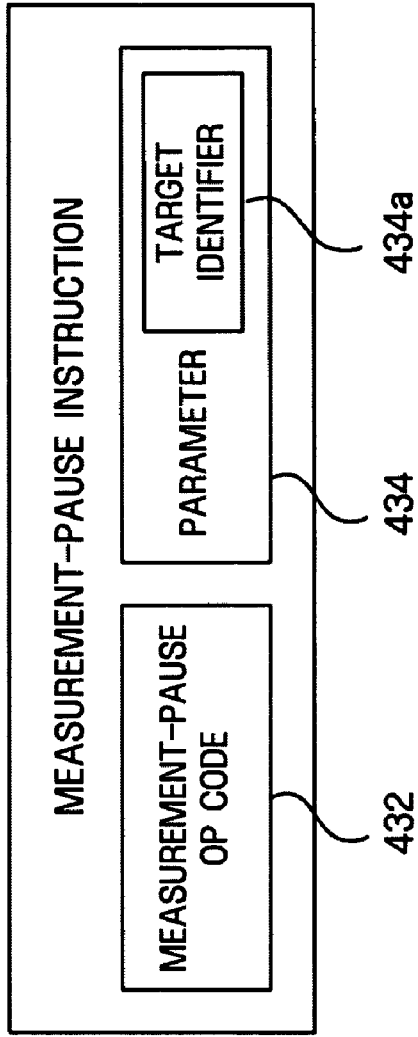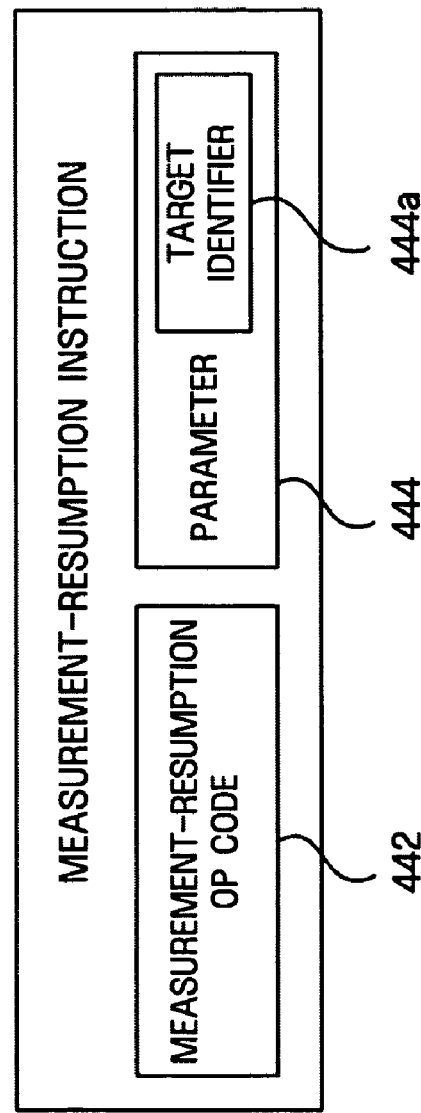

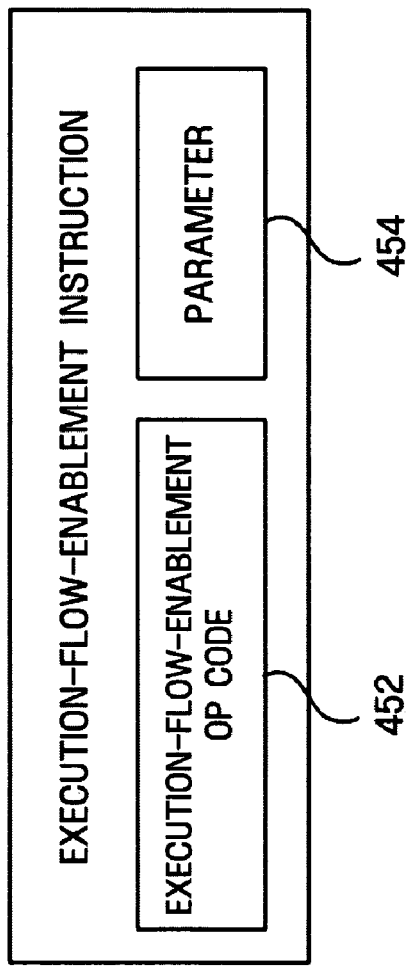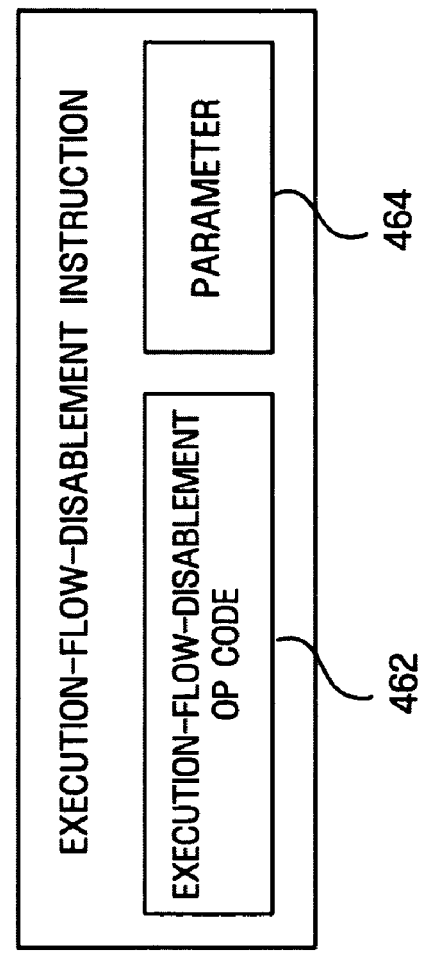
FIG. 4E
FIG. 4F

METHOD AND APPARATUS FOR TESTING EXECUTION FLOW OF PROGRAM

CROSS-REFERENCE TO RELATED APPLICATION

This application is based on and claims priority from Korean Patent Application No. 10-2006-0015708, filed on Feb. 17, 2006, the disclosure of which is incorporated herein in its entirety by reference.

BACKGROUND OF THE INVENTION

1. Field of the Invention

Methods and apparatuses consistent with the present invention relate to an execution flow of a program. More particularly, the present invention relates to a method and apparatus for testing an execution flow of a program.

2. Description of the Related Art

Technologies for measuring and verifying the integrity of a program are used to detect forgeries. However, because the method of measuring integrity handles a program image at a certain point of time, it has been used only for verification. That is, because the related art integrity-measuring technology does not consider time, it is possible to find a forgery of a program image at a certain point of time, but it is not possible to get information about whether the program image has been forged before the measuring and then restored again, which is a problem.

In order to solve this problem, a method of measuring integrity periodically has been suggested. However, as the program image becomes larger and is more frequently measured, more time and costs are required for measuring its integrity, which decreases the performance of the program and the system.

SUMMARY OF THE INVENTION

The present invention provides a method and apparatus for testing whether a program is being executed in the way it was designed to be executed.

The present invention also provides a method and apparatus for performing an execution-flow test efficiently, thus decreasing the load of a system.

According to an aspect of the present invention, there is provided a method of testing an execution flow of a program, the method including measuring the execution flow that reflects instruction values constituting the program and an execution order of the instructions; and verifying the measured execution flow.

According to an aspect of the present invention, there is provided an apparatus for testing an execution flow of a program, the apparatus including an execution-flow-measuring module that tests the execution flow that reflects instruction values constituting the program and an execution order of the instructions; and an execution-flow-verifying module that verifies the measured execution flow.

BRIEF DESCRIPTION OF THE DRAWINGS

The above and other aspects of the present invention will become apparent by describing in detail exemplary embodiments thereof with reference to the attached drawings, in which:

FIGS. 4A to 4G illustrate instructions according to an exemplary embodiment of the present invention.

DETAILED DESCRIPTION OF EXEMPLARY EMBODIMENTS OF THE INVENTION

Figure 1:
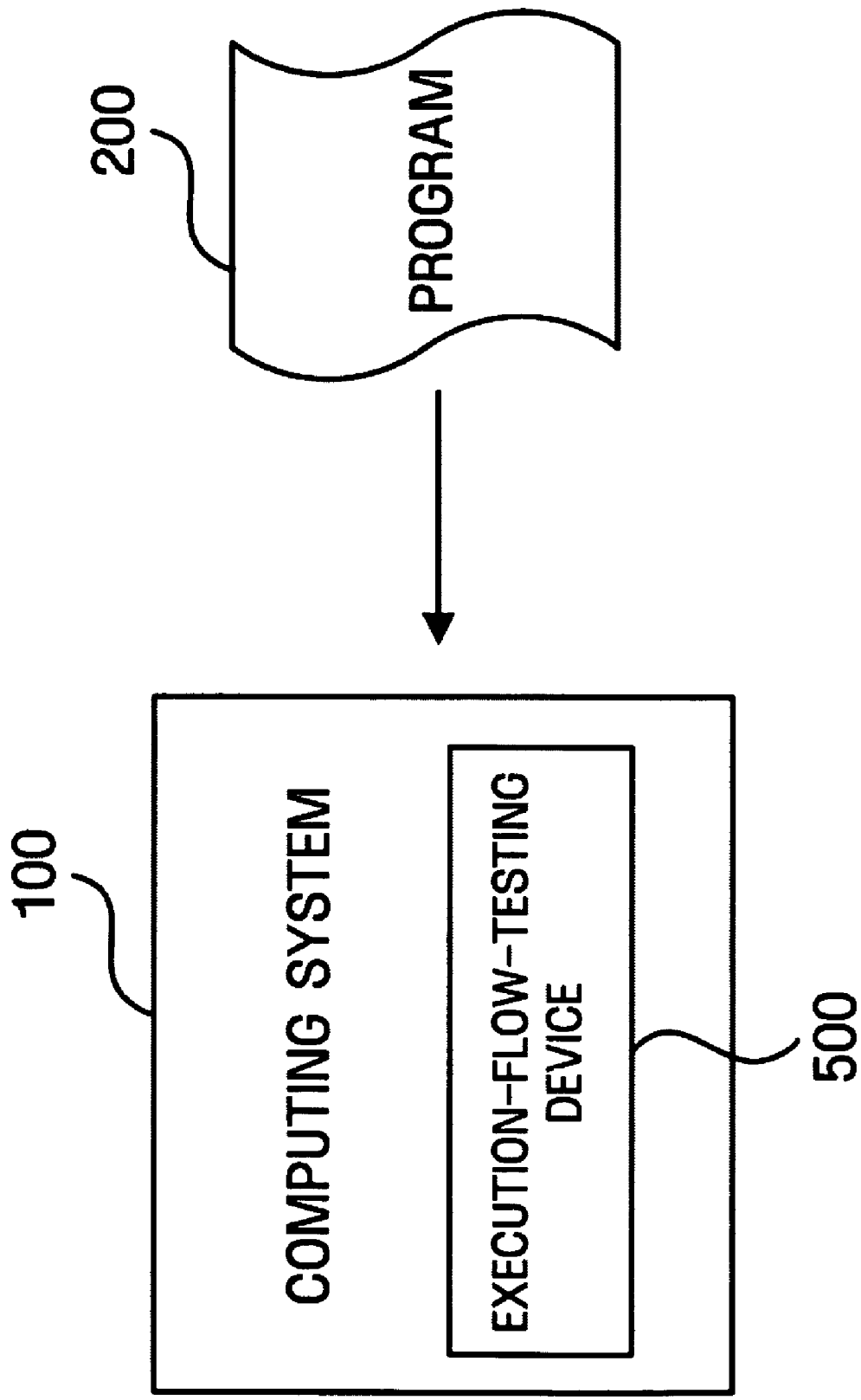
FIG. 1 illustrates a computing system and a program according to an exemplary embodiment of the present invention.

Exemplary embodiments of the present invention will be described in detail with reference to the accompanying drawings.

Advantages and features of the present invention and methods of accomplishing the same may be understood more readily by reference to the following detailed description of the exemplary embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification.

Hereinafter, exemplary embodiments of the present invention will be described in more detail with reference to the accompanying drawings.

FIG. 1 illustrates a computing system and a program according to an exemplary embodiment of the present invention.

A computing system 100 is a device that can execute a program 200, such as a mobile phone, a personal digital assistant (PDA), a set-top box, a notebook computer, or a desktop computer. The computing system 100 includes an execution-flow-testing device 500 that checks whether the program 200 is operating normally. The execution-flow-testing device 500 tests an execution flow in order to check the operation of the program 200. Here, the execution flow means a locus of an execution path of the instructions, decided by an operation, a branch, a jump, and a return. Hence, the execution flow can be expressed as information that reflects instruction values constituting the program 200 and an execution order of the instructions.

The execution-flow testing consists of an execution-flow measuring and an execution-flow verifying. The execution-flow measuring can be performed by a predetermined checksum calculation using instructions executed by driving the program 200 as input values, and the execution-flow verifying can be executed by comparing a checksum result value generated as a result of the execution-flow measuring and a predetermined reference measurement value. The execution-flow testing will be explained in detail with reference to FIGS. 5 to 12.

In order to be tested by the execution-flow-testing device 500, the program 200 needs to include predetermined information necessary for the operation of the execution-flow-testing device 500. In other words, a program developer, who wants a program to be tested by the execution flow test, can write the program so that it has information and a structure necessary for the test.

The whole or some parts of the program 200 may need to be tested, and the program developer can set parts to be tested as test targets. One or more test targets can be set within the program 200.

Hereinafter, a structure of a program according to an exemplary embodiment will be described with reference to FIGS. 2 to 4G, but the present invention is not limited to the program structures described in the following.

Figure 2:
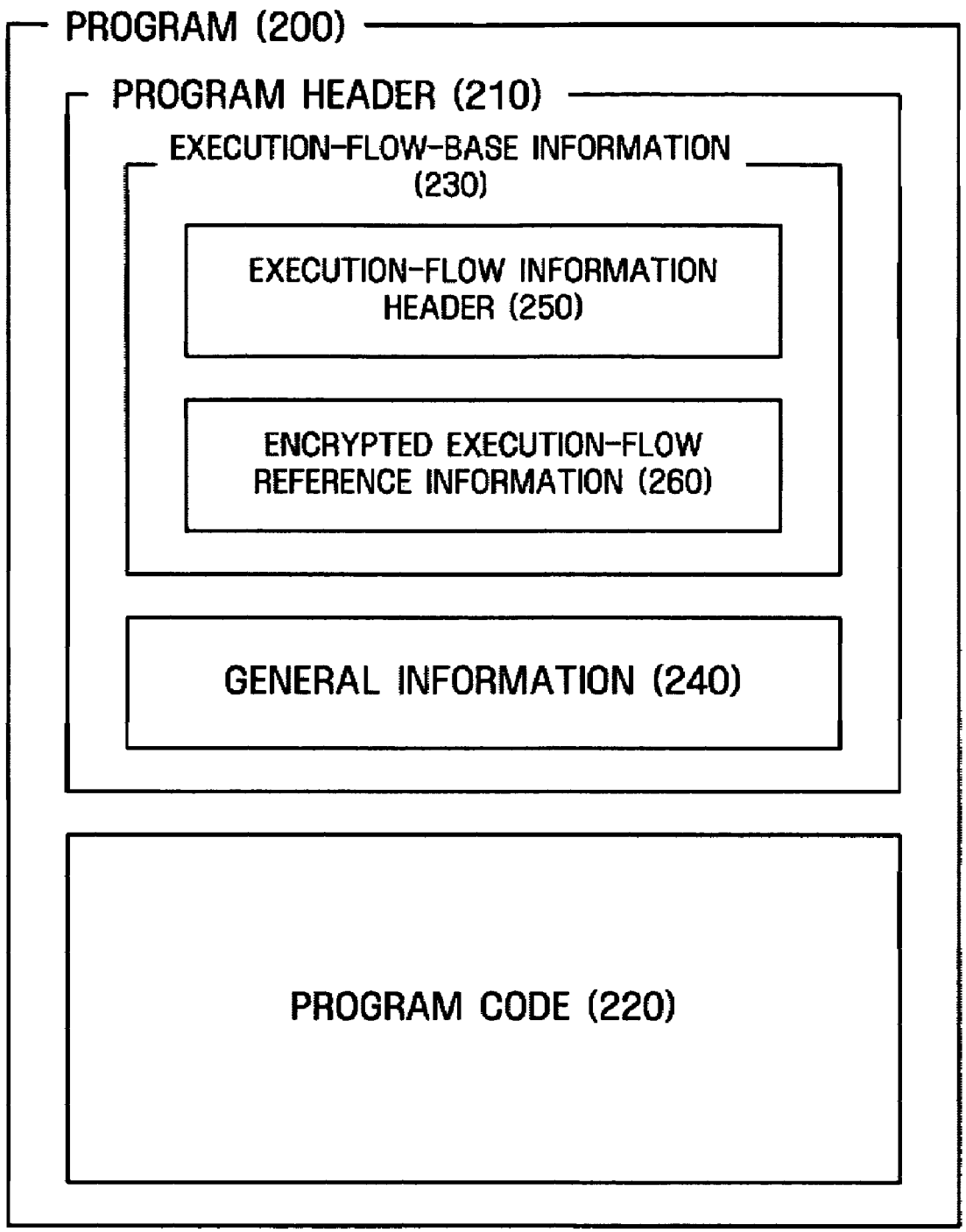
FIG. 2 illustrates a structure of a program according to an exemplary embodiment of the present invention.

FIG. 2 illustrates a structure of a program according to an exemplary embodiment of the present invention.

The illustrated program 200 includes a program header 210 having predetermined metadata and program code 220 to be executed in the computing system 100.

The program header 210 includes execution-flow base information 230 and general information 240. Here, the general information 240 is metadata about the program 200, and includes various information inserted in a program header in the related art. Conversely, the execution-flow base information 230 is necessary for the execution-flow test according to an exemplary embodiment of the present invention, and includes an execution-flow-information header 250 and encrypted execution-flow reference information 260.

The execution-flow information header 250 includes metadata necessary for decrypting the encrypted execution-flow reference information 260. For example, the execution-flow information header 250 can include information representing kinds of encryption algorithm applied to the encrypted execution-flow reference information 260. If the encrypted execution-flow reference information 260 is decrypted, execution-flow reference information 300 can be acquired as shown in FIG. 3.

Figure 3:
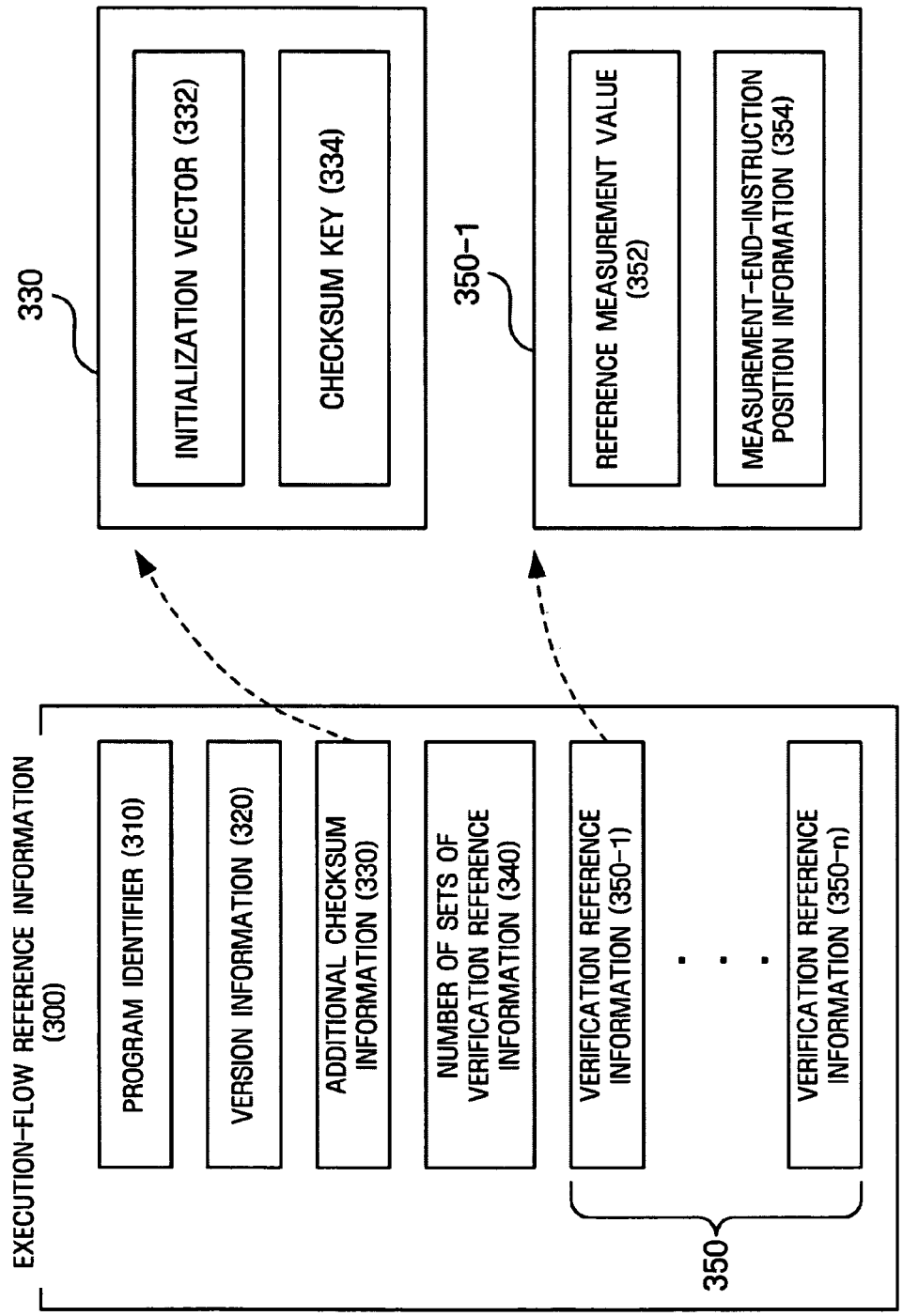
FIG. 3 illustrates execution flow reference information according to an exemplary embodiment of the present invention.

In FIG. 3, the execution-flow reference information 300 includes a reference information set that includes a program identifier 310, version information 320, additional checksum information 330, a number of sets of verification reference information 340, and one or more sets of verification reference information 350-1 to 350-n.

The program identifier 310 is a unique set of information allocated to the program 200, and can identify different programs by the program identifier.

The version information 320 determines a structure, a type and a using method of reference information, and is used in checking in which format the execution-flow reference information has been written down. The execution-flow-testing device 500 can determine whether execution-flow testing needs to be performed by comparing version information 320 of the program 200 and version information that can be treated by the device itself. For example, the execution-flow-testing device 500 performs the test if both sets of version information are the same, and the test may not be performed, if both sets of version information are not the same.

The additional checksum information 330 includes information necessary for calculating a checksum on instructions executed when driving the program 200. The additional checksum information 330 can include appropriate information depending on checksum algorithm. For example, the additional checksum information 330 can include an initialization vector 332 and a checksum key 334. But the present invention is not limited to the vector and the key.

The number of sets of verification reference information 340 means the number of sets of verification reference information 350-1 to 350-n included in the reference information 300.

The reference information set 350 includes one or more sets of verification reference information 350-1 to 350-n, and the sizes of the sets of verification reference information 350-1 to 350-n are preferably the same. As illustrated in FIG. 3, each set of verification reference information 350-1 to 350-n includes a reference measurement value 352 and measurement-end-instruction position information 354. The reference measurement value 352 is a set of information which is compared with an execution-flow measurement result when verifying an execution flow of the execution-flow-testing device 500. The measurement-end-instruction position information 354 represents a position of a measurement-end instruction included in an execution-flow-testing target to which a reference measurement value 352 is applied. The measurement-end instruction will be described later with reference to FIG. 4B.

The measurement-end-instruction position information 354 is a relative address value for indicating the position of a measurement-end instruction in a program 200, and can be calculated as a distance from a start address of a program to the measurement-end instruction. If a malicious change has been made to a program code 220, such as changing or removing the position of instructions related with the execution-flow testing, the measurement-end-instruction position information 354 can be used to detect the change.

Each set of verification reference information 350-1 to 350-n corresponds to an execution-flow-testing target existing in the program 200. Hence, the number of execution-flow-testing targets and the number of sets of verification reference information 350-1 to 350-n are the same. The correspondence of each set of verification reference information 350-1 to 350-n with execution-flow-testing targets can be confirmed by a target identifier included in measurement-start instructions, which will be described later with reference to FIG. 4A. For example, the target identifier can be expressed in a form of information related with an array order of a plurality of sets of verification reference information 350-1 to 350-n. Here, if the target identifier is confirmed, the location of one set of verification reference information corresponding to a certain execution-flow-testing target is located among the plurality of sets of verification reference information 350-1 to 350-n.

Referring to FIG. 2, the program code 220 consists of a plurality of instructions. The plurality of instructions can be classified as execution-flow-testing-base instructions and program-base instructions.

The program-base instructions are for the program itself, and a computing system can perform work to achieve a predetermined goal by executing the program-base instructions.

The execution-flow-testing-base instructions are for execution-flow testing of a program, and the execution-flow-testing device 500 can control the execution-flow testing of the program 200 by the execution-flow-testing-base instructions.

The execution-flow-testing-base instructions can be divided into a measurement-start instruction, a measurement-end instruction, a measurement-pause instruction, a measurement-resumption instruction, an execution-flow-enablement instruction, an execution-flow-disablement instruction, and a state-information-request instruction.

In the program 200, a execution-flow-testing target can be constituted, starting from the measurement-start instruction to the measurement-end instruction. In other words, a set of the measurement-start instruction and the measurement-end instruction is used to set an execution-flow-testing target.

Figure 4A:
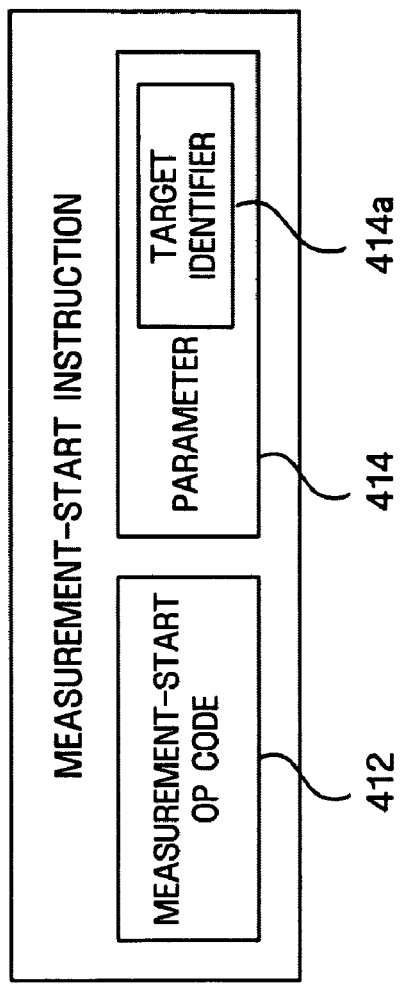

The measurement-start instruction is used to start execution-flow measuring. The measurement-start instruction can include a measurement-start operation code (OP code) 412 that orders start of the execution-flow measuring, and a predetermined parameter 414, as illustrated in FIG. 4A. A target identifier 414a for identifying an execution-flow-testing target can be included in the parameter 414. The target identifier 414a can have a form that represents an array order of corresponding sets of verification reference information among the plurality of sets of verification reference information 350-1 to 350-n. Therefore, if there is a plurality of execution-flow-testing targets in a program, the location of a set of verification reference information corresponding to each execution-flow-testing target is located among the plurality of sets of verification reference information 350-1 to 350-n via the target identifier 414a included in the measurement-start instruction of each execution-flow-testing target. The target identifier 414a can also be used to check errors of execution-flow measuring.

Figure 4B:
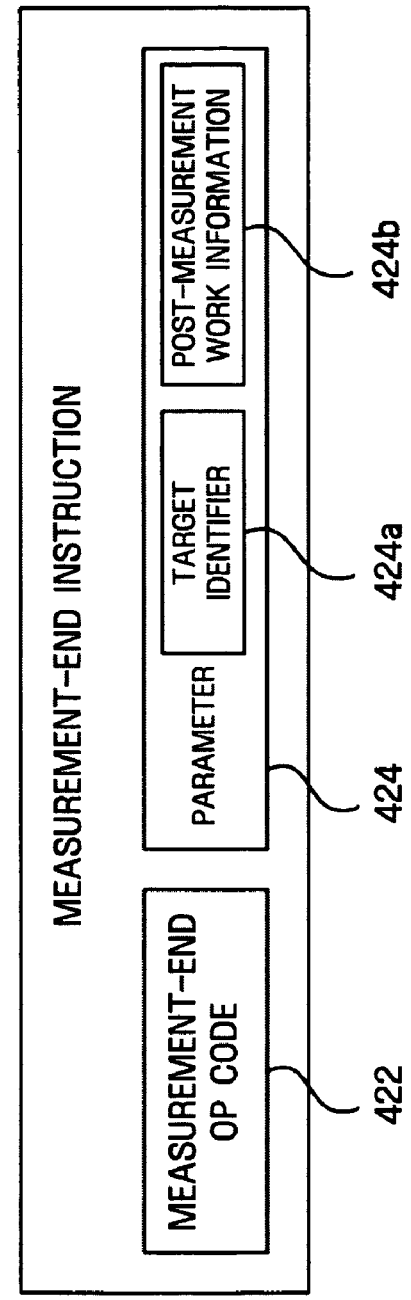

The measurement-end instruction is used to terminate execution-flow measuring. The measurement-end instruction can include a measurement-end operation code 422 that orders termination of the execution-flow measuring and a predetermined parameter 424, as illustrated in FIG. 4B. The parameter 424 can include a target identifier 424a to identify an execution-flow-testing target and post-measurement work information 424b that orders work to be performed after the termination of the execution-flow measuring. An exemplary embodiment that can be performed after the execution-flow measuring is terminated, is execution-flow verifying. Various post-measurement work information 424b that orders work to be performed after the execution-flow measuring can exist.

The measurement-pause instruction is used to temporarily stop execution-flow measuring. The measurement-pause instruction can include a measurement-pause operation code 432 that orders a pause of the execution-flow measuring and a predetermined parameter 434, as illustrated in FIG. 4C. A target identifier 434a to identify an execution-flow-testing target can be included in the parameter 434.

The measurement-resumption instruction is used to resume execution-flow testing which has been temporarily stopped. The measurement-resumption instruction can include a measurement-resumption operation code 422 that orders resumption of the execution-flow measuring and a predetermined parameter 444, as illustrated in FIG. 4D. A target identifier 444a to identify an execution-flow-testing target can be included in the parameter 444.

The execution-flow-enablement instruction is used to activate a function of performing execution-flow testing. In other words, if the execution-flow-enablement instruction is fetched, the execution-flow-testing device 500 can prepare performance of execution-flow testing on the program 200.

The execution-flow-enablement instruction can include an execution-flow-enablement operation code 452 that orders activation of an execution-flow-testing function and a predetermined parameter 454, as illustrated in FIG. 4E.

The execution-flow-disablement instruction is used to deactivate a function of performing execution-flow testing. In other words, if the execution-flow-disablement instruction is fetched, the execution-flow-testing device 500 can deactivate the execution-flow-testing of the program 200. The execution-flow-disablement instruction can include an execution-flow-disablement operation code 462 that orders deactivation of an execution-flow-testing function and a predetermined parameter 464, as illustrated in FIG. 4F.

Figure 4G:
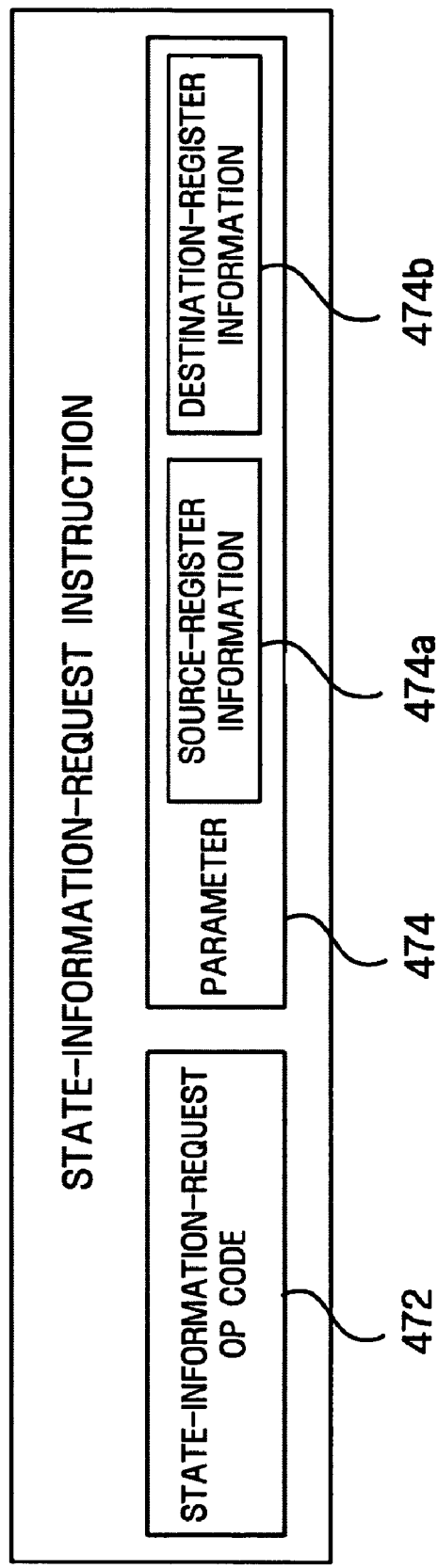

The state-information-request instruction is used to acquire state information related to execution-flow testing. For example, if an execution-flow-verification result or a state of execution-flow-measurement errors needs to be referred to, the state-information-request information can be used. The state-information-request instruction includes a state-information-request operation code 472 that orders a state-information request and a predetermined parameter 474, as illustrated in FIG. 4G. Here, the parameter 474 can include information 474a about a source register to provide state information and information 474b about a destination register to store the provided state information.

The present invention is not limited to the structure of the afore-mentioned program. Hence, the program structure can be implemented in various forms that include information necessary for measuring and verifying an execution flow.

Hereinafter, an execution-flow-testing device and operation process thereof according to an embodiment of the present invention are described.

Figure 5:
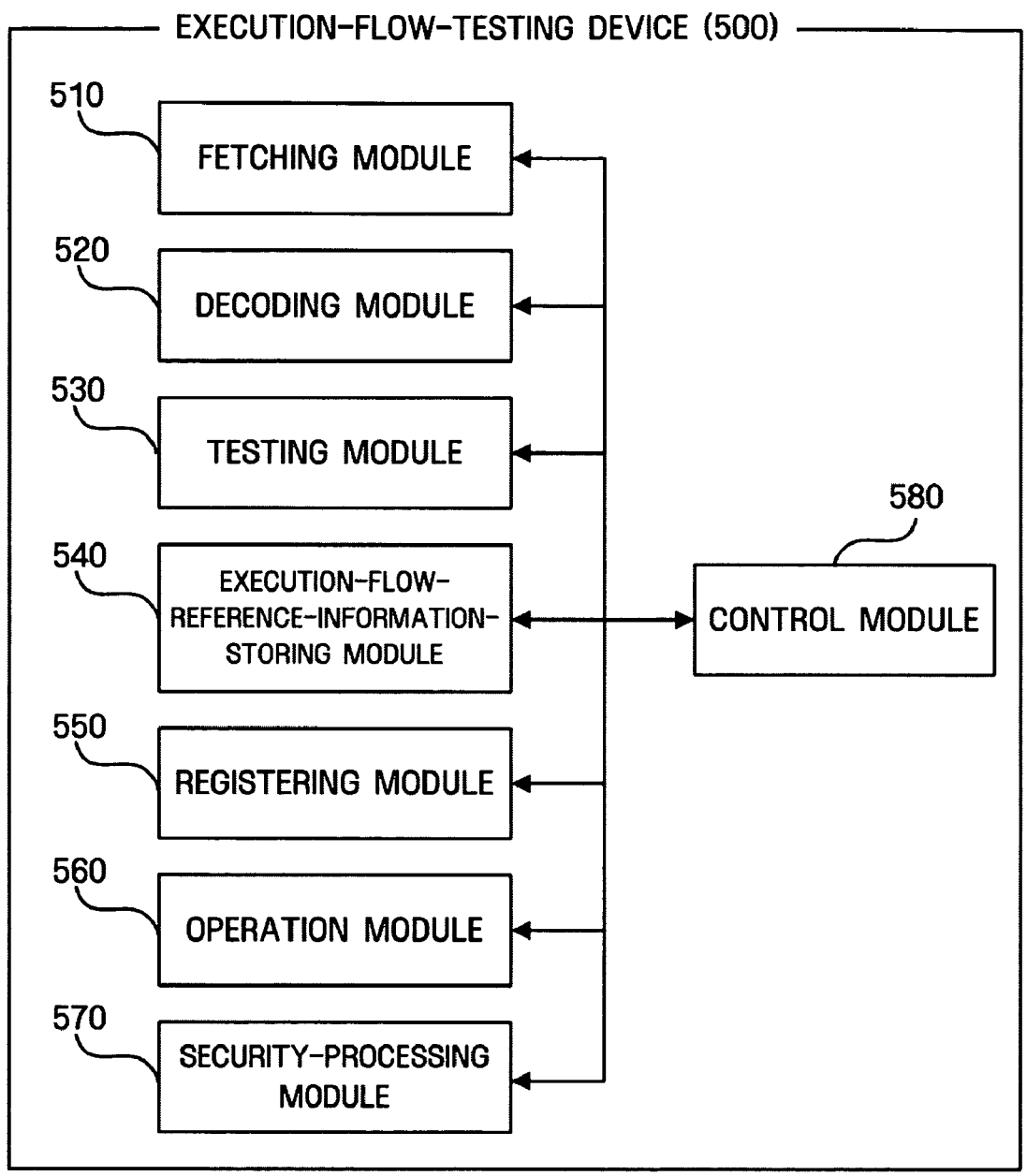
FIG. 5 is a block diagram illustrating an execution-flow-testing device according to an exemplary embodiment of the present invention.

FIG. 5 is a block diagram illustrating an execution-flow-testing device according to an exemplary embodiment of the present invention. The illustrated execution-flow-testing device 500 includes a fetching module 510, a decoding module 520, a testing module 530, an execution-flow-reference-information-storing module 540, a registering module 550, an operation module 560, a security-processing module 570, and a control module 580. The execution-flow-testing device 500 can function as a main processing unit, e.g., a Central Processing Unit (CPU). In FIG. 5, it is illustrated that the security-processing module 570 is included in the execution-flow-testing device 500, but the security-processing module 570 can separately exist depending on embodiments.

If the program 200 is loaded into main memory (e.g., Random Access Memory (RAM)) of the computing system 100, the security-processing module 570 reads the execution-flow base information 230 of the program 200 from the main memory, and decrypts the encrypted execution-flow reference information 260. The encrypted execution-flow reference information 260 included in the program 200 cannot be understood in a general, but the information is understood as the information is decrypted in the security-processing module 570.

Because the execution-flow reference information 300 acquired by description work is important in testing the execution flow of the program 200, the information is preferably not exposed to other devices or modules except the execution-flow-testing device 500. For the prevention of the exposure, the security-processing module 570 can block access from an external module or an arbitrary device physically and logically.

Further, in order to keep security of the execution-flow reference information 300, the encrypted execution-flow reference information 260 can be made not to be decrypted in other devices or modules except the security-processing module 570. For example, the security-processing module 570 includes an individual key used in an open key algorithm (e.g., Diffie-Hellman, RSA, ElGamal, and Elliptic Curve), and a program developer can encrypt execution-flow reference information by using an open key corresponding to the individual key held by the security-processing module 570. Here, a device or a module, which is not holding the individual key corresponding to the open key used in encrypting the execution-flow reference information 300, cannot decrypt the encrypted execution-flow reference information 260, and the security-processing module 570 can decrypt the encrypted execution-flow reference information 260.

The execution-flow-reference-information-storing module 540 stores the execution-flow reference information 300 decrypted by the security-processing module 570. The execution-flow reference information 300 can be acquired from the security-processing module 570 when an execution-flow-enablement instruction is input. If an execution-flow-disablement instruction is input, the execution-flow-reference-information-storing module 540 can delete the execution-flow reference information 300 being stored. The execution-flow reference information 300 has been described with reference to FIG. 3.

The fetching module 510 fetches instructions of the program 200 loaded into main memory of the computing system 100 in order. Here, the fetching order of the instructions can be determined by codes inserted to each instruction by the program developer, such as an operation, a branch, a jump, and a return.

The decoding module 520 decodes instructions fetched by the fetching module 510.

Figure 6:
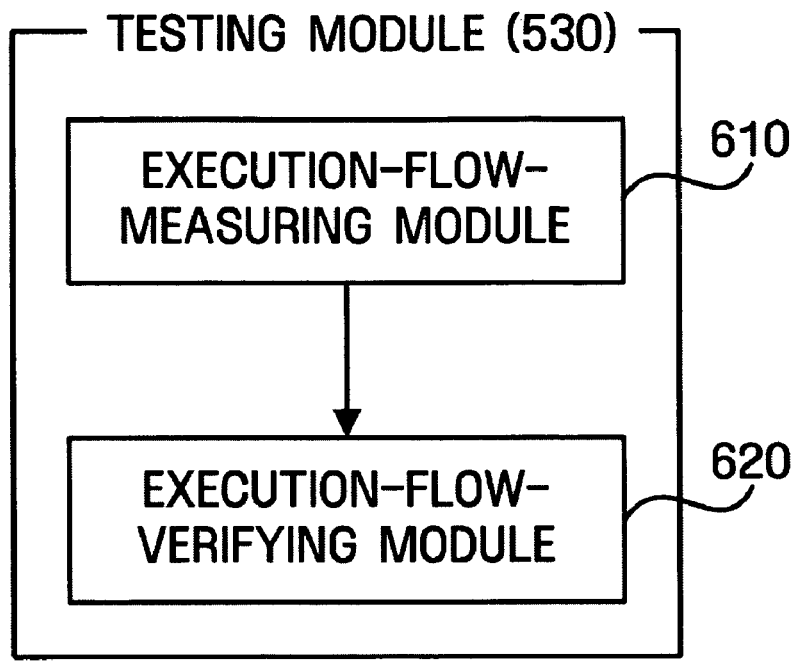
FIG. 6 is a block diagram illustrating a testing module according to an exemplary embodiment of the present invention.

The testing module 530 tests an execution flow of instructions decoded by the decoding module 520. For the test, the testing module 530 includes an execution-flow-measuring module 610 and an execution-flow-verifying module 620, as illustrated in FIG. 6.

The execution-flow-measuring module 610 can perform the execution-flow measuring by checksum calculation using instructions decoded by the decoding module 520 as input values. Instructions to be objects of execution-flow measuring are continuously supplied from the decoding module 520 while the program 200 is executed and the execution-flow-measuring operation is performed. The execution-flow measuring is started as the decoding module 520 decodes a measurement-start instruction, and is terminated when the decoding module 520 decodes a measurement-end instruction. Here, if the decoding module 520 decodes a measurement-resumption instruction, the execution-flow measuring is resumed.

Figure 7:
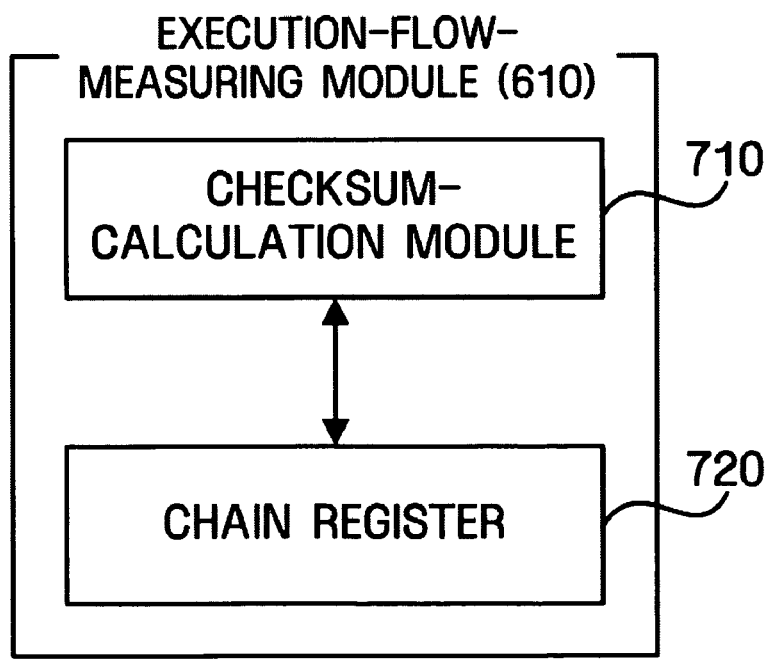
FIG. 7 is a block diagram illustrating a program-measuring module according to an exemplary embodiment of the present invention.

FIG. 7 illustrates an exemplary embodiment on the execution-flow-measuring module 610. The illustrated execution-flow-measuring module 610 includes a checksum-calculation module 710 and a chain register 720.

The checksum-calculation module 710 calculates a checksum using a current instruction value, a checksum key and the previously-calculated checksum result value as input values. In order to calculate the checksum, the checksum-calculation module 710 can use a predetermined hash function such as Message Digest 5 (MD5) or Secure Hash Algorithm-1 (SHA-1). The checksum-calculation module can also use logic operators such as NAND and AND. For reference, execution-flow-testing base instructions as described with reference to FIGS. 4A to 4G are preferably excluded from objects of checksum calculation. In other words, objects of checksum calculation are program-base instructions.

Among input values used for checksum calculation, the checksum key is an input value used to raise the security of the checksum calculation, and can have a random value. The checksum key could have been inserted in the program 200 by a program developer. According to the embodiment shown in FIG. 3, the checksum key is included in the execution-flow reference information 300, and the checksum-calculation module 710 can acquire the checksum key from the execution-flow-reference-information-storing module 540. If a proper checksum key is not recognized, a right checksum result value cannot be acquired.

The chain register 720 stores and holds the checksum result value and provides the value to the checksum-calculation module 710 again.

Figure 8:
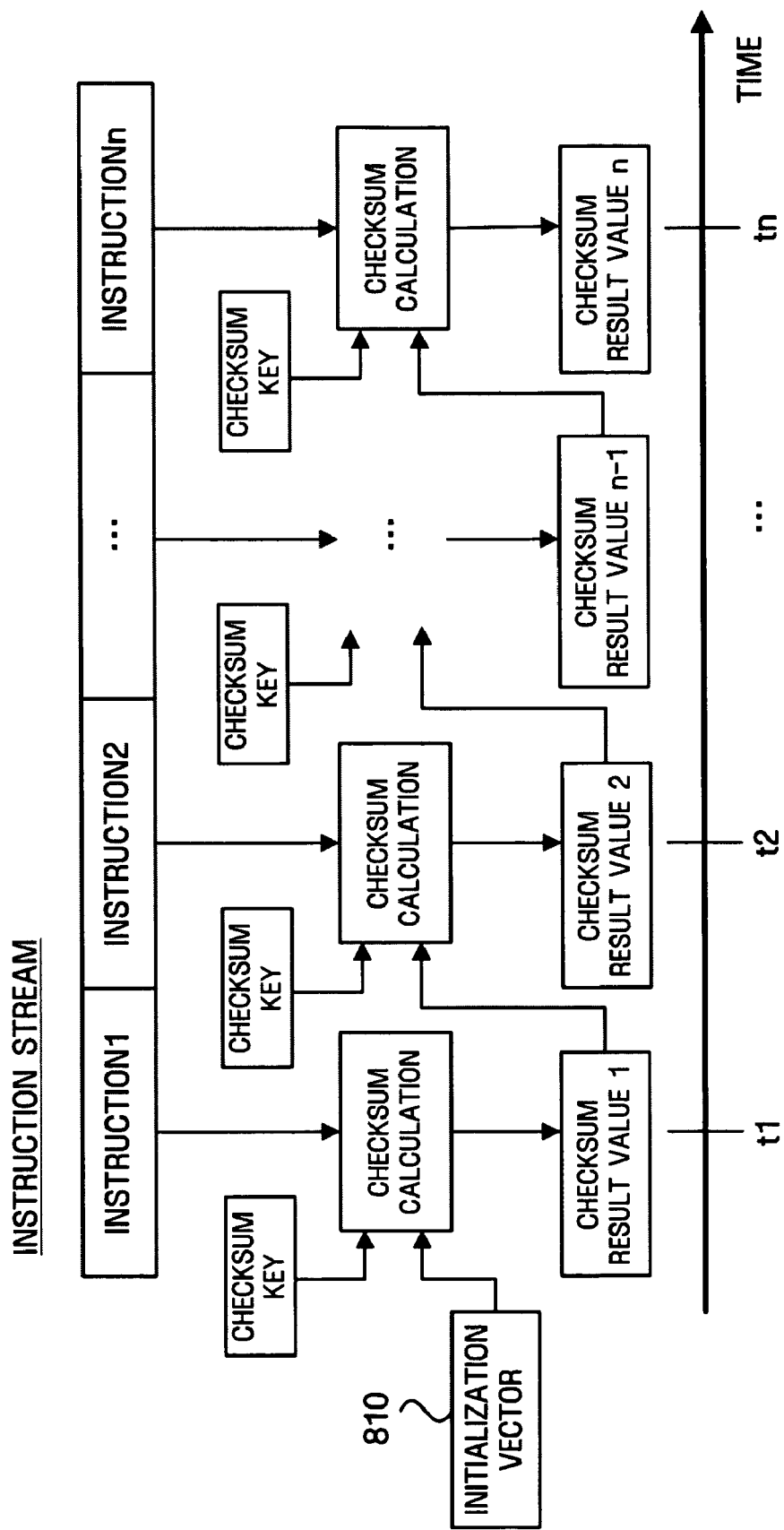
FIG. 8 illustrates a process of calculating a checksum according to an exemplary embodiment of the present invention.

The checksum-calculation process of the execution-flow-measuring module 610 is illustrated in FIG. 8. When the checksum-calculation work is performed for the first time at a time t1, because there is no calculated checksum result value, an initialization vector 810 having the same number of bits as the result value is used. Hence, when the first checksum is calculated, the checksum-calculation module 710 uses the instruction value, the initialization vector 810, and the checksum key as input values. The initialization vector 810 also can be inserted to the program 200 by a program maker as in the checksum key. According to the embodiment shown in FIG. 3, the initialization vector 332 is included in the execution-flow reference information 300. The checksum-calculation module 710 can acquire the initialization vector 810 from the execution-flow-reference-information-storing module 540.

After the first checksum calculation is performed, over time the checksum-calculation work is performed using an instruction value, calculated checksum result values, and the checksum key as input values. The checksum result values having been calculated are stored in the chain register 720, and then can be provided to the checksum-calculation module 710.

For reference, when programs are executed, instructions are sometimes executed in the order stored in the main memory. However, the instructions are sometimes executed by a branch, a jump or a return regardless of the stored order. Hence, an instruction stream illustrated in FIG. 8 means instructions listed in the order fetched by the fetching module 510, not the order stored in the main memory.

The output checksum result values reflect not only values of instructions themselves but also the order of execution of instructions.

Referring to FIG. 6, the execution-flow-verifying module 620 verifies whether the execution flow of a program is normal, by comparing checksum result values output from the execution-flow-measuring module 610 with a predetermined reference measurement value. If both values are the same, it can be understood that the execution flow of the instruction is normal, and the program is operating as designed. However, if the two values are not the same, it can be understood that the execution flow of the instructions is not normal, and the program is not operating as designed. The reference measurement value may have been inserted in the program. For example, the program maker can insert a checksum result value, which has been acquired through the same work with the execution-flow measuring performed by the execution-flow-testing device 500 when making the program, as the reference measurement value in the program. According to the embodiment shown in FIG. 3, the reference measurement value 352 is included in the execution-flow reference information 300, and the execution-flow-verifying module 620 can acquire the reference measurement value from the execution-flow-reference-information-storing module 540.

Figure 9:
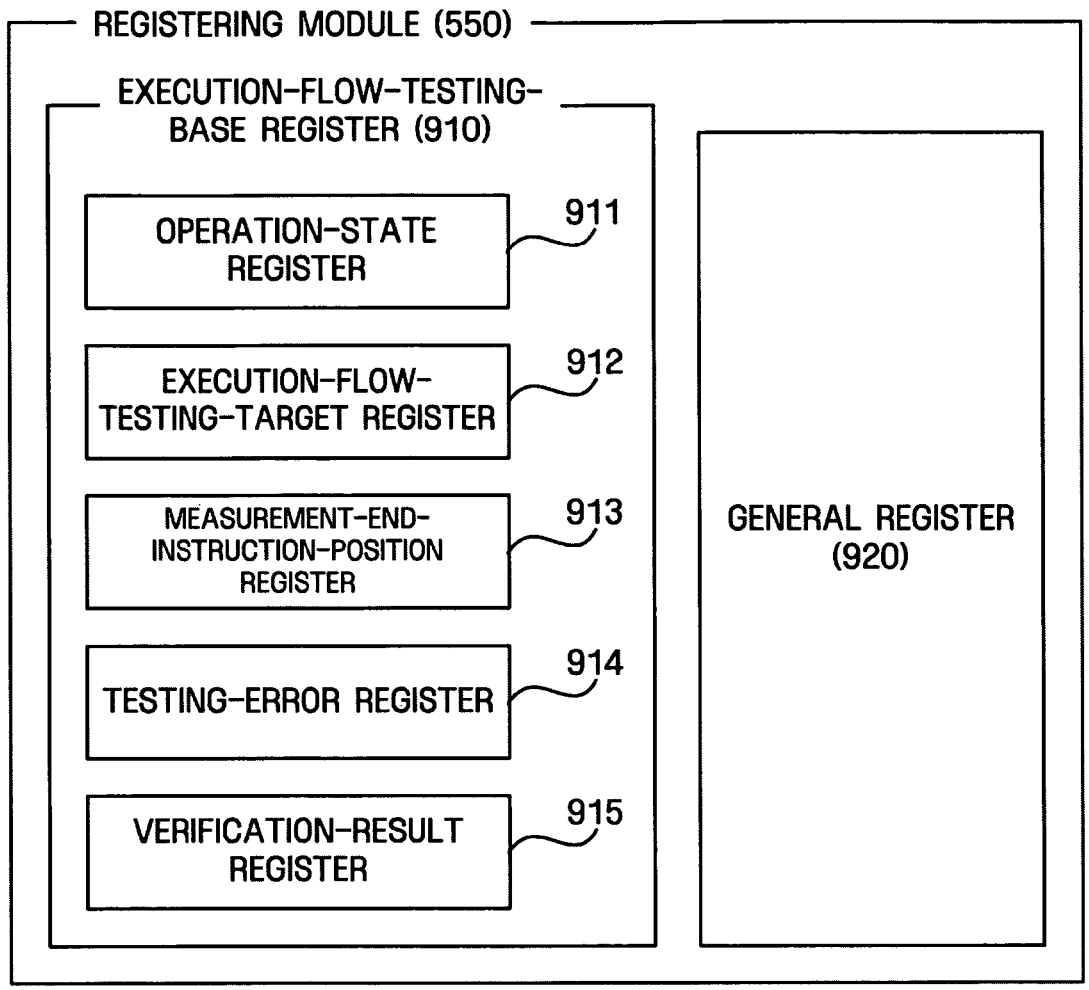
FIG. 9 illustrates a registering module according to an exemplary embodiment of the present invention.

Referring FIG. 5, the registering module 550 includes a plurality of registers. The registers included in the registering module 550 can be divided into execution-flow-testing-base registers 910 and general registers 920, as shown in FIG. 9.

The execution-flow-testing-base registers 910 include an operation-state register 911, an execution-flow-testing-target register 912, a measurement-end-instruction-position register 913, a testing-error register 914, and a verification-result register 915.

The operation-state register 911 stores an operation state on the execution-flow testing. The operation states according to an exemplary embodiment of the present invention can be divided into deactivation state, measurement-on state, measurement-off state, and measurement-pause state.

The deactivation state indicates that a function for the execution-flow testing of a program has been deactivated. And the measurement-on state and the measurement-off state indicate the state where the measuring work is being performed and the state where the measuring work has been terminated, respectively. Also, the measurement-pause state indicates the state where the execution-flow measuring has been temporarily stopped.

The operation-state register 911 stores one among the afore-mentioned states, and the operation state of the execution-flow-testing device 500 is determined depending on the operation state stored by the operation-state register 911. The transition of operation state of the execution-flow-testing device 500 will be described later with reference to FIG. 10.

The execution-flow-testing-target register 912 stores a target identifier to identify the execution-flow-testing target currently being tested among execution-flow-testing targets existing in the program 200. The target identifier can be acquired in the parameter of the measurement-start instruction if the measurement-start instruction is input. The testing module 530 can identify the execution-flow-testing target currently being tested via the target identifier stored in the execution-flow-testing-target register 912.

The measurement-end-instruction-position register 913 stores position information of the measurement-end instruction included in the execution-flow-testing target being measured by the execution flow. The position information of the measurement-end instruction can be acquired from the execution-flow reference information stored in the execution-flow-reference-information-storing module 540. For example, if the measurement-start instruction is input, the corresponding verification reference information is retrieved by the target identifier included in the measurement-start instruction, and the position information of the measurement-end-instruction included in the retrieved verification reference information is stored in the measurement-end-instruction-position register 913.

In order to execute the program 200, whenever an instruction is fetched, the control module 580 checks relative address information of the fetched instruction and compares the information with the measurement-end-instruction-position information stored in the measurement-end-instruction-position register 913. Here, the relative address information indicates a relative distance value from the starting position of the program code 220 area to the position of the instruction.

If the instruction of a relative address matched with the measurement-end-instruction-position information stored in the measurement-end-instruction-position register 913 is a measurement-end instruction, the control module 580 terminates the execution-flow measuring in progress and proceeds with the execution-flow verifying. However, if the instruction of a relative address matched with the measurement-end-instruction-position information stored in the measurement-end-instruction-position register 913 is not a measurement-end instruction, the control module 580 can determine that there is a problem in the execution-flow measuring. Hence, the control module 580 can prevent wrong operation of the execution-flow testing by the change of the measurement-end instruction on the program 200.

If there is a problem in the execution-flow measuring, the testing-error register 914 stores information to indicate the problem.

The verification-result register 915 stores the result of the execution-flow verification. The verification result is one among "unset" meaning there is no special information, "valid" meaning the execution flow is normal, and "invalid" meaning the execution flow is not normal.

Referring to FIG. 5, the operation module 560 executes instructions decoded by the decoding module 520. An example of the operation module 560 is an arithmetic logic unit (ALU).

The control module 580 controls an operation process of modules (510 to 570) constituting the execution-flow-testing device 500. Especially, the control module 580 manages the execution-flow testing, and can use information stored in the afore-mentioned execution-flow-testing-base registers 911 to 915 for the management.

Figure 10:
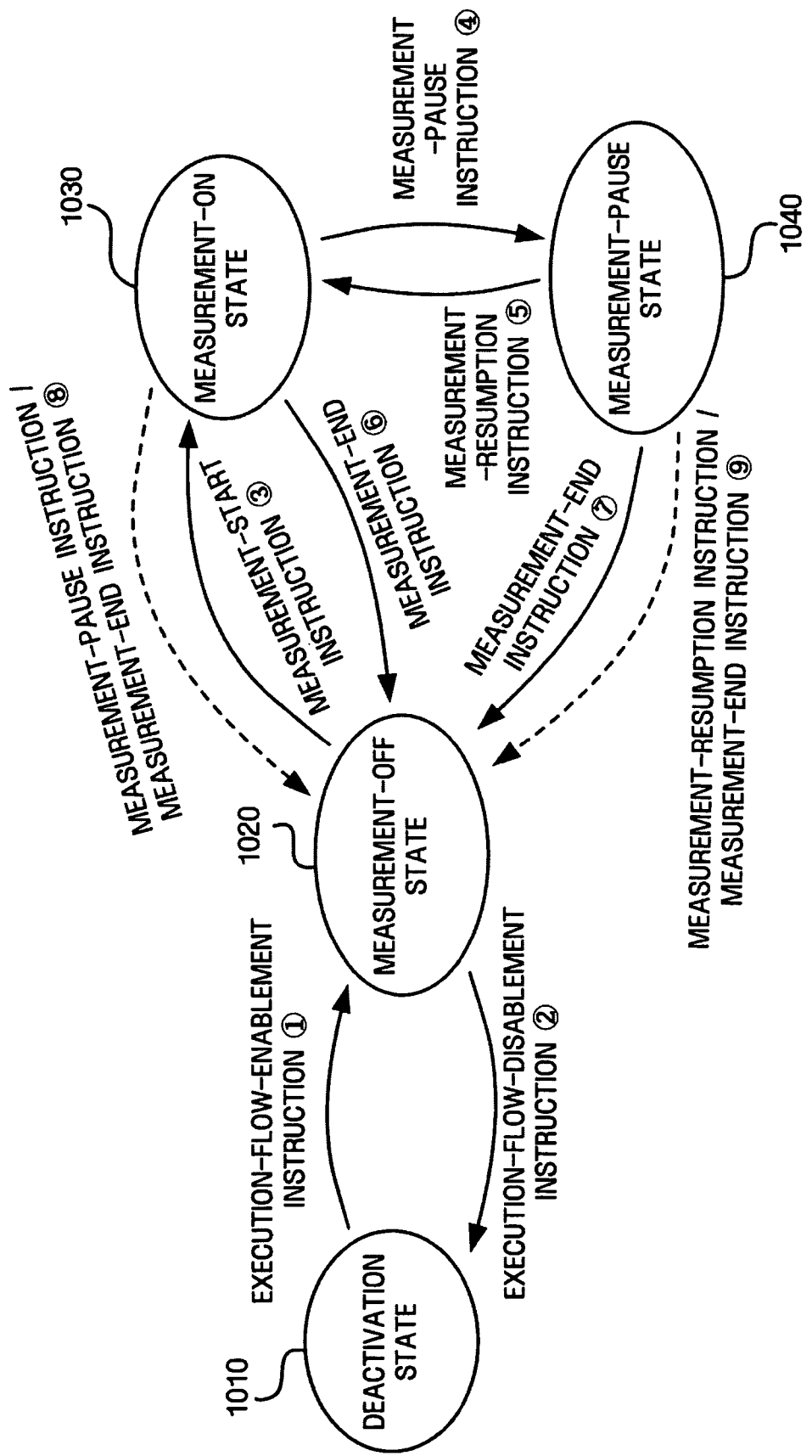
FIG. 10 illustrates transition between operation states according to an exemplary embodiment of the present invention.

FIG. 10 illustrates transition between operation states of the execution-flow-testing device 500 according to an exemplary embodiment of the present invention. The execution-flow-testing device 500 can be set as one among four operation states 1010 to 1040 as shown, and the operation state can be changed depending on the kind of the current operation and the fetched execution-flow-testing-base instruction.

The initial operation state of the execution-flow-testing device 500 is the deactivation state 1010, and the operation-state register 911 has been set as the deactivation state. In other words, the execution-flow-testing function of the execution-flow-testing device 500 is the deactivation state. In the case where the operation-state register 911 has been set as the deactivation state 1010, if the execution-flow-enablement instruction is input, the operation-state register 911 is set as the measurement-off state 1020. Here, the execution-flow-testing function of the execution-flow-testing device 500 is activated, and the execution-flow reference information 300 decrypted in the security-processing module 570 is stored in the execution-flow-reference-information-storing module 540. The execution-flow-testing target register 912, the verification-result register 915, and the testing-error register 914 are set as "unset" meaning there is no special information. In the case where the operation state register 911 has been set as an operation state exempting the deactivation state 1010, if the execution-flow-enablement instruction is input, the control module 580 can disregard it.

Further, in the case where the operation-state register 911 has been set as the measurement-off state, if the measurement-start instruction is input, the operation-state register 911 is set as the measurement-on state 1030. Here, the execution-flow-testing-target register 912 stores a target identifier included in the measurement-start instruction, and the position information of the measurement-end instruction included in the execution-flow-testing target is stored. The position information of the measurement-end instruction can be known through the execution-flow reference information 300 stored in the execution-flow-reference-information-storing module 540. The testing-error register 914 and the testing-result register 915 are set as "unset."

In the measurement-on state 1030, the execution-flow-testing device 500 performs the execution-flow-measurement work on general instructions input after the measurement-start instruction. In the case where the operation-state register 911 has been set as an operation state except the measurement-off state 1020, if the measurement-start instruction is input, the control module 580 cannot disregard the instruction.

In the case where the operation-state register 911 has been set as the measurement-on state 1030, if the measurement-pause instruction is input, the operation-state register 911 is set as the measurement-pause state 1040. Here, the execution-flow-testing device 500 temporarily stops the execution-flow measuring. In the case where the operation-state register 911 has been set as an operation state except the measurement-on state 1030, if the measurement-pause instruction is input, the control module 580 can disregard the instruction.

In the case where the operation-state register 911 has been set as the measurement-pause state 1040, if the measurement-resumption instruction is input, the operation-state register 911 is set as the measurement-on state 1030. Here, the execution-flow-testing device 500 resumes the execution-flow measuring on instructions input after the measurement-resumption instruction. In the case where the operation-state register 911 has been set as an operation state exempting the measurement-pause state 1040, if the measurement-resumption instruction is input, the control module 580 can disregard the instruction.

In the case where the operation-state register 911 has been set as the measurement-on state 1030 or the measurement-pause state 1040, if the measurement-end instruction is input, the operation-state register 911 is set as the measurement-off state 1020. Here, the execution-flow-testing device 500 terminates the execution-flow testing. Then, the execution-flow-testing device 500 performs the post-measurement work included in the measurement-end instruction. If the post-measurement work is the execution-flow verification work, the testing module 530 compares the calculated measurement result value with the reference measurement value. If both values are the same, the program has been performed as designed, and if both values are not the same, the program has not been performed as designed. Hence, if both values are the same, the verification-result register 915 is set as "valid," and if both values are not the same, the verification-result register 915 is set as "invalid." After the execution-flow verifying has been performed, the execution-flow-testing-target register 912 is set as "unset." In the case where the operation-state register 911 has been set as an operation state exempting the measurement-on state 1030 or the measurement-pause state 1040, if the measurement-end instruction is input, the control module 580 can disregard the instruction.

Further, in the case where the operation-state register 911 has been set as the measurement-on state 1030, if the measurement-end instruction or the measurement-pause instruction is input, the control module 980 compares the target identifier included in the measurement-end instruction or the measurement-pause instruction and the target identifier stored in the execution-flow-testing-target register 912. If both identifiers are the same, the execution-flow-measuring operation does not experience a problem. However, if both identifiers are not the same, the execution-flow-measuring operation experiences a problem. Here, the testing-error register 914 stores information that there has been an error in measuring the execution-flow, and the verification-result register 915 and the execution-flow-testing-target register 912 is set as "unset." The operation-state register 911 is set as the measurement-off state 1020, and the execution-flow measuring is stopped.

Such a process can be performed in the same way in the case where the measurement-end instruction or the measurement-resumption instruction is input. The operation-state transition indicated by a dotted line shows the case where an error has occurred.

Figure 11:
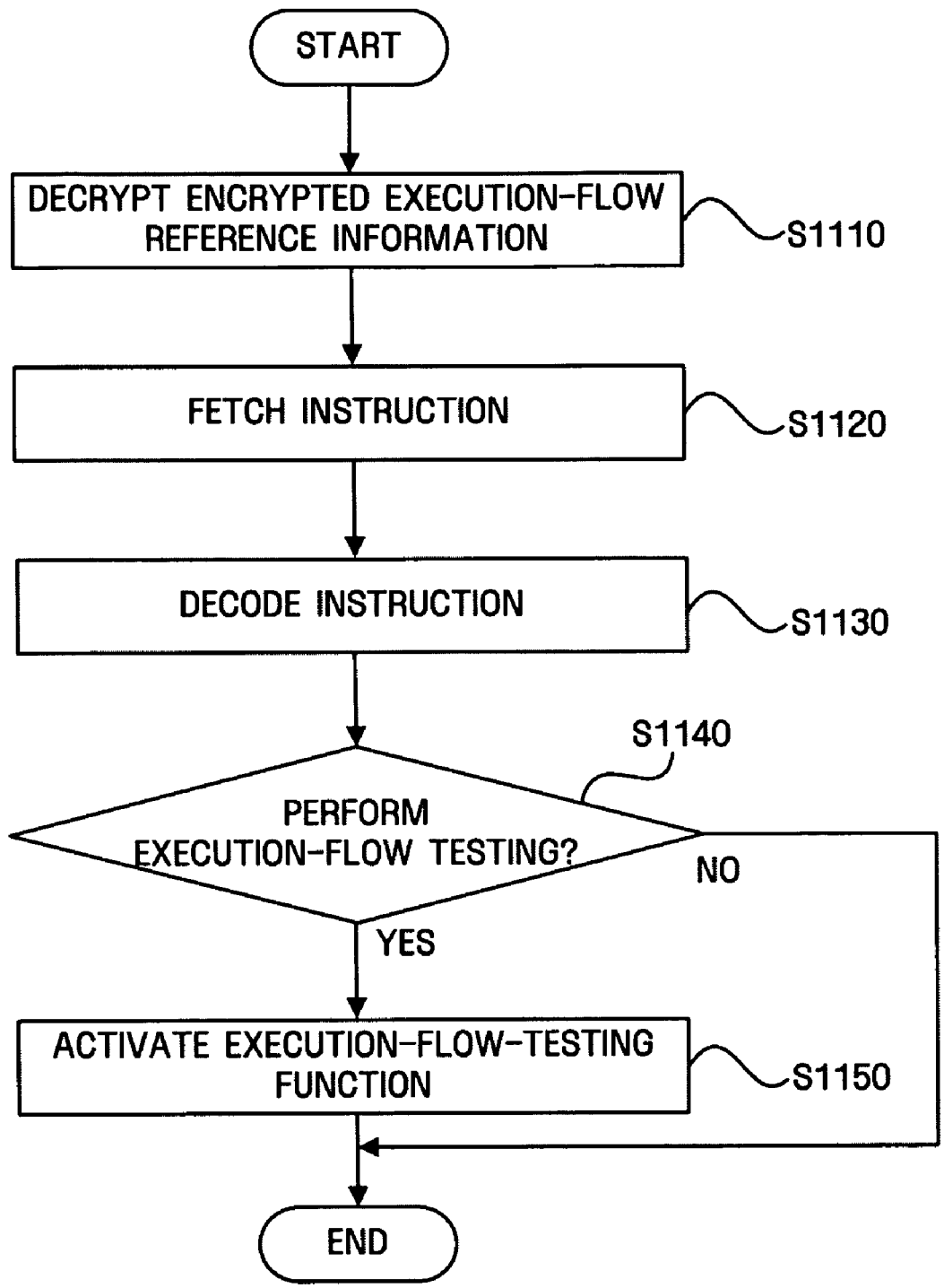
FIGS. 11 to 13 are flow charts illustrating a process of testing an execution flow according to an exemplary embodiment of the present invention.

FIG. 11 is a flow chart illustrating a process of activating an execution-flow-testing function according to an exemplary embodiment of the present invention.

First, when the program 200 is loaded into the main memory of the computing system 100, the security-processing module 570 reads the execution-flow reference information 260 encrypted in the program, and decrypts the information (S1110). If the program 200 loaded into the main memory is a general program prior to the present invention, the security-processing module 570 cannot read the encrypted execution-flow reference information 260, and the program 200 will be executed without the execution-flow testing.

Further, the fetching module 510 fetches instructions of the program 200 loaded into the main memory (S1120), and the decoding module 520 decodes fetched instructions (S1130).

Here, the control module 580 determines whether the testing work on the execution flow of the program 200 needs to be performed (S1140). For example, if the execution-flow-enablement instruction is input, the control module 580 should perform the testing work.

In the case where the execution-flow testing needs to be performed, the control module 580 activates the execution-flow-testing function (S1150). Here, the execution-flow-reference-information-storing module 540 can store the execution-flow reference information 300 decrypted by the security-processing module 570.

Figure 12:
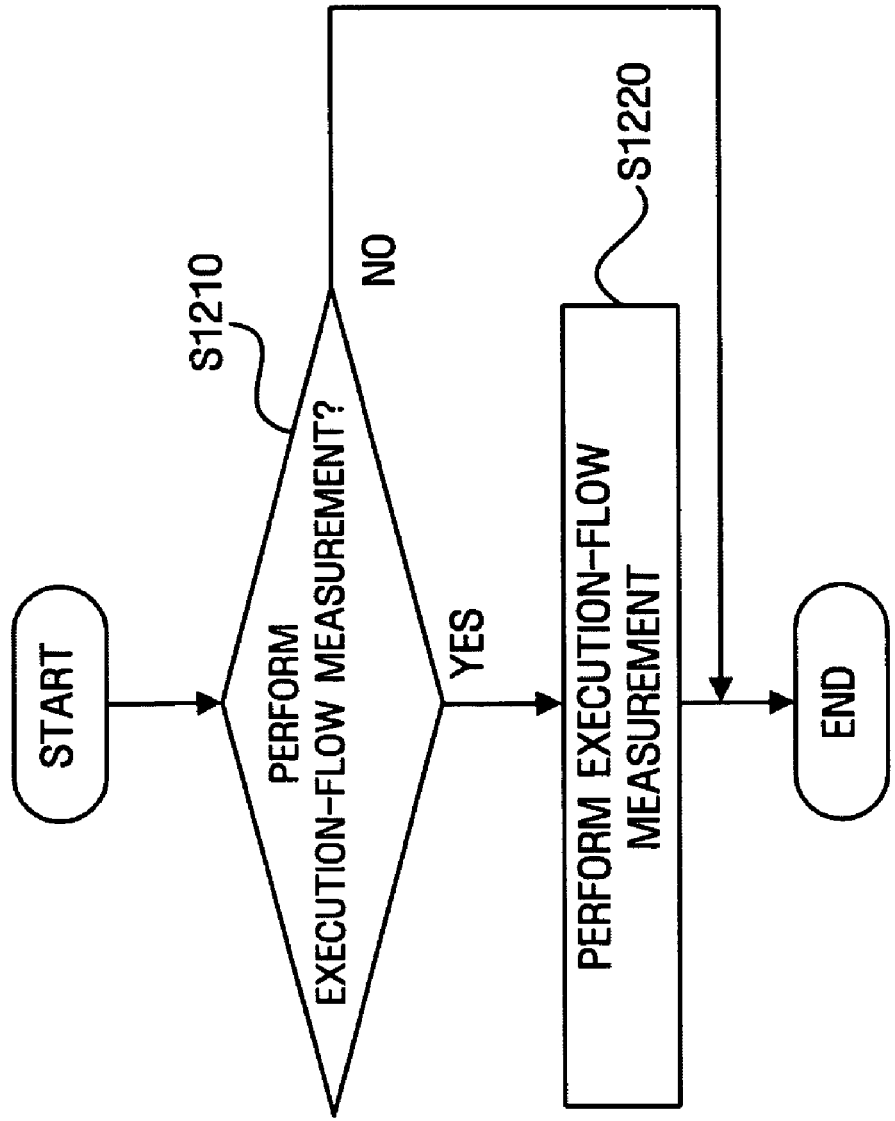

FIG. 12 is a flow chart illustrating the execution-flow-measuring process according to an exemplary embodiment of the present invention.

Whenever an instruction is decoded by the decoding module 520, the control module 580 determines whether the execution-flow measuring needs to be performed (S1210). For example, if the measurement-start instruction is input, the control module 580 should start the execution-flow measuring.

If the execution-flow measuring needs to be performed, the testing module 530 measures the execution flow of input instructions (S1220). Specifically, the testing module 530 calculates the checksum using instructions as input values, and the calculation has been described with reference to FIG. 8.

Figure 13:
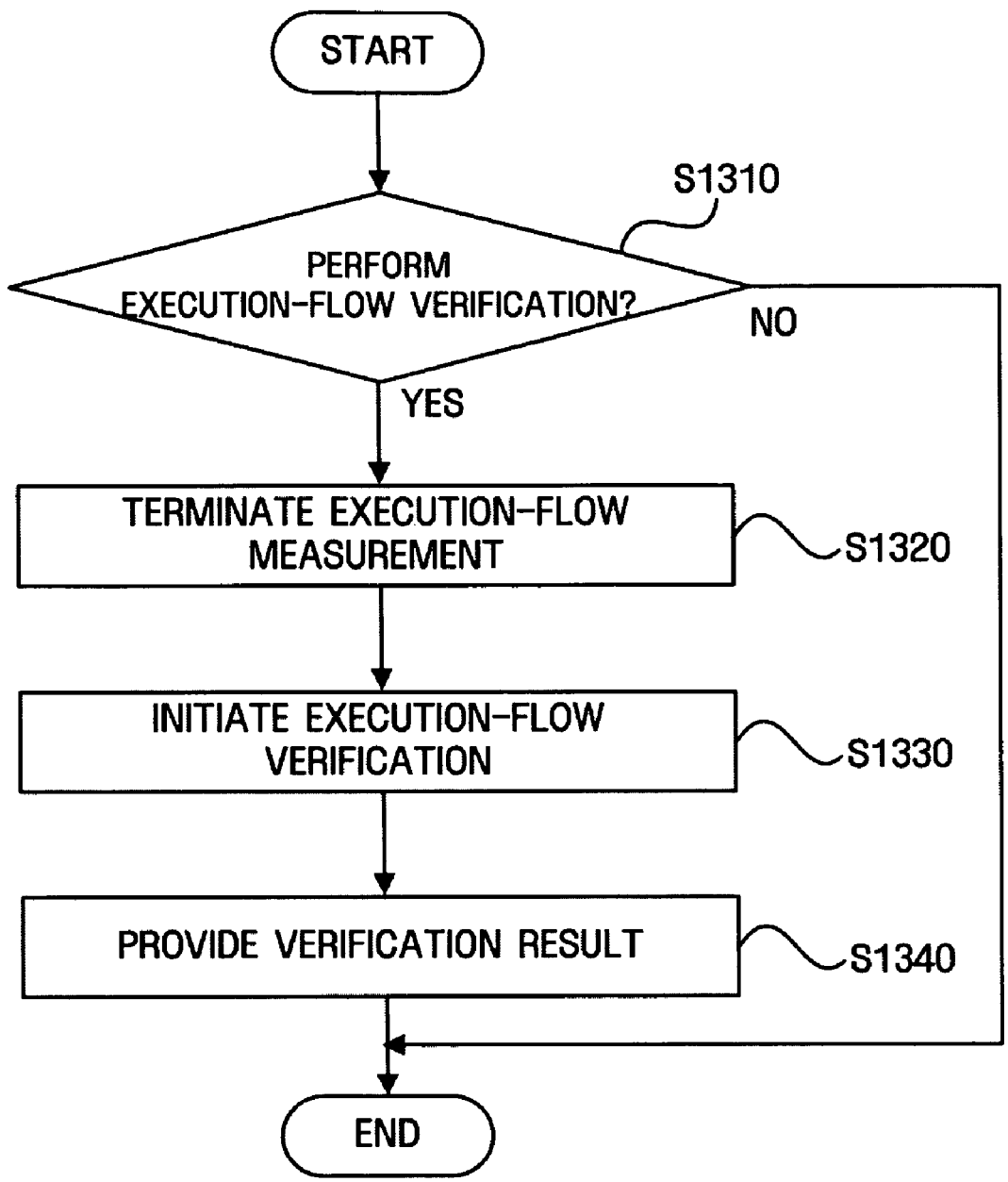

FIG. 13 illustrates an execution-flow-verifying process according to an exemplary embodiment of the present invention.

While the execution-flow measuring is performed, whenever an instruction is decoded by the decoding module 520, the control module 580 determines whether the execution-flow verifying needs to be performed (S1310). For example, if the measurement-end instruction is input, the control module 580 should start the execution-flow verifying.

If the execution-flow needs to be verified, the testing module 530 terminates the execution-flow measuring of input instructions (S1320). Then, the testing module 530 performs the execution-flow verifying if the calculated execution-flow-measurement result value and a predetermined reference-calculation value are the same (S1330), and the execution-flow-verification result can be provided (S1340).

In operation S1330, if both values are the same, the program has been performed in the way it was designed, and thus the verification-result register 915 can store information that the execution flow is not normal. Here, the control module 580 can forcibly terminate the execution of the program 200.

Further, whenever instructions are decoded by the decoding module 520, the control module 580 can determine whether the execution-flow measuring needs to be temporarily stopped. For example, if the measurement-pause instruction is input, the control module 580 should temporarily stop the execution-flow measuring.

If the execution-flow measuring needs to be temporarily stopped, the testing module 530 temporarily stops the execution-flow measurement of input instructions.

In the case where the execution-flow measuring has been temporarily stopped, whenever an instruction is decoded by the decoding module 520, the control module 580 can determine whether the execution-flow measuring needs to be resumed. For example, if the measurement-resumption instruction is input, the control module 580 should resume the stopped execution-flow-measurement work.

If the execution-flow measuring needs to be resumed, the testing module 530 resumes the execution-flow measuring of input instructions.

Further, if the state-information-request instruction is input, the control module 580 can provide information stored in the verification-result register 915 or the testing-error register 914 to a certain place. The place where the state information is provided can be known by the state-information-request instruction.

The state information to a specific place is provided in order for a user to receive the execution-flow-testing result.

Figure 14:
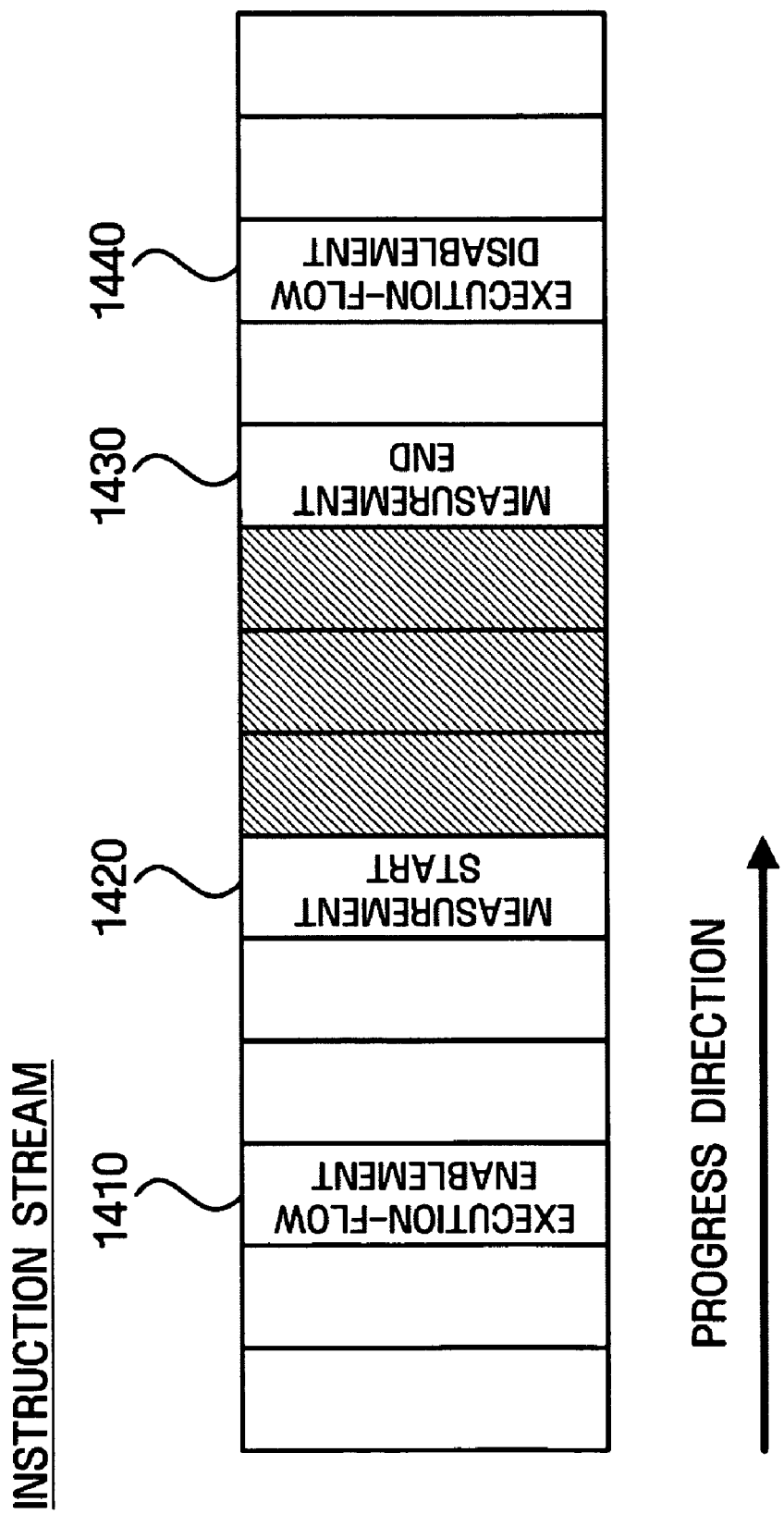
FIG. 14 illustrates a process of testing an execution flow according to an exemplary embodiment of the present invention.

FIG. 14 illustrates an execution-flow-testing process according to an exemplary embodiment of the present invention.

The illustrated instruction stream indicates instructions constituting the program 200. The instructions are executed from left to right, as illustrated by the arrows.

If the execution-flow-enablement instruction 1410 is input, the execution-flow-testing device 500 prepares the execution-flow testing. Here, the execution-flow reference information 300 decrypted in the security-processing module 570 is stored in the execution-flow-reference-information-storing module 540, and the execution-flow-testing-base register 910 is set as predefined values.

Then, the measurement-start instruction 1420 is input, and the checksum-calculation work is performed using instructions input after the measurement-start instruction 1420 as input values. The checksum-calculation work is performed until the measurement-end instruction 1430 is input. In FIG. 14, shaded parts indicate instructions used in the checksum calculation, and are an execution-flow-testing target. If the measurement-end instruction 1430 is input, the execution-flow-measurement work is terminated, and the execution-flow-verification work is performed.

Then, if the execution-flow-disablement instruction 1440 is input, the execution-flow-testing device 500 deactivates the execution-flow-testing function. Here, sets of information stored in the execution-flow-reference-information-storing unit 540 can be deleted.

Figure 15:
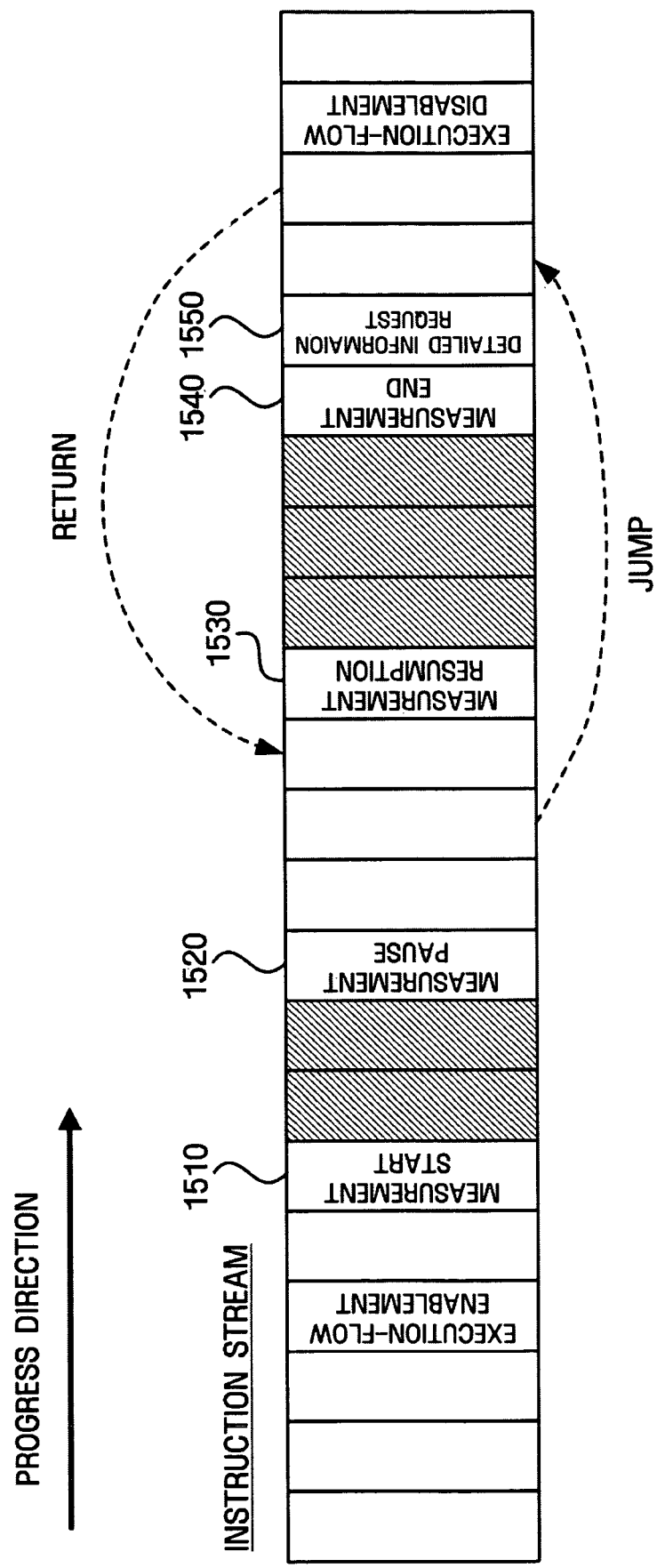
FIG. 15 illustrates a process of testing an execution flow according to another exemplary embodiment of the present invention.

FIG. 15 illustrates an execution-flow-testing process according to another exemplary embodiment of the present invention.

While the measurement-start instruction 1510 is input and the execution-flow measuring is performed, if the measurement-pause instruction 1520 is input, the execution-flow-testing device 500 temporarily stops the execution-flow measuring. Here, the checksum result value stored in the chain register 720 is preserved until the measurement-resumption instruction 1530 is input.

In the illustrated example, instructions are performed regardless of the order of the listed order of the instructions because of a jump and a return.

If the measurement-resumption instruction 1530 is input, the execution-flow-testing device 500 resumes the execution-flow measuring. The execution-flow measuring is continued until the measurement-end instruction 1540 is input, and shaded instructions have been used in measuring the execution-flow in the illustrated embodiment.

If the measurement-end instruction 1540 is input, the execution-flow measuring is terminated, and the execution-flow verifying is performed. Then, if the state-information-request instruction 1550 is input, among sets of information related with the state-information-testing work, sets of information indicated by the state-information-request instruction 1550 can be stored in a register.

It should be understood by those of ordinary skill in the art that various replacements, modifications and changes may be made in the form and details without departing from the spirit and scope of the present invention as defined by the following claims. Therefore, it is to be appreciated that the above described exemplary embodiments are for purposes of illustration only and are not to be construed as limitations of the invention.

According to exemplary embodiments of the present invention, a program can be tested to see if it performs as it was designed to perform.

Also, according to exemplary embodiments of the present invention, an execution-flow test is efficiently performed, thus lowering the load of a system.

What is claimed is:

1. A method of testing an execution flow of a program using a test apparatus comprising a processor, the method comprising:
    measuring the execution flow, under control of the processor, by:
        measuring values of a plurality of instructions constituting the program; and
        calculating test values for the plurality of instructions at a plurality of time points during execution of the program by using the measured values; and
    verifying the measured execution flow, under control of the processor, by comparing the test values with a reference value,
    wherein, in the calculating the test values, each of the test values at a corresponding time point of the plurality of time points, except a test value at a first time point of the plurality of time points, is calculated by further using a test value which is calculated at a previous time point of the plurality of time points by using a value of a corresponding instruction among the plurality of instructions, and
    wherein the plurality of instructions comprise a measurement-start instruction which instructs starting the measuring the execution flow, and a measurement-end instruction which instructs terminating the measuring the execution flow.

2. The method of claim 1, wherein the measuring the execution flow comprises:
    starting the measuring the execution flow, if a measurement-start instruction is input; and
    terminating the measuring the execution flow, if a measurement-end instruction is input.

3. The method of claim 1, wherein the measuring the execution flow further comprises pausing the measuring the execution flow, if a measurement-pause instruction is input.

4. The method of claim 3, wherein the measuring the execution flow further comprises resuming the measuring the execution flow which is paused by the measurement-pause instruction, if a measurement-resumption instruction is input.

5. The method of claim 1, wherein the each of the calculated test values is a checksum.

6. The method of claim 5, wherein, in the calculating the test values, the each of the test values at the corresponding time point, including the test value at the first time point, is calculated by further using a checksum key, and
wherein the test value at the first time point is calculated by further using an initialization vector.

7. The method of claim 5, wherein the plurality of time points are set according to an execution order of the plurality of instructions comprising at least one of operation, branch, jump and return.

8. The method of claim 1, wherein the verifying the measured execution flow comprises providing information indicating that the execution flow has been normally performed, if a test value calculated at a last time point of the plurality of time points and the reference value are the same, and information indicating that the execution flow has not been normally performed, if a test value calculated at a last time point of the plurality of time points and the reference value are not the same.

9. The method of claim 8, further comprising acquiring the reference value from the program.

10. The method of claim 1, further comprising acquiring the reference value from the program.

11. The method of claim 1, further comprising decrypting the reference information which is encrypted.

12. An apparatus for testing an execution flow of a program, the apparatus comprising:
a processor;
an execution-flow-measuring module that measures the execution flow, under control of the processor, by:
measuring values of a plurality of instructions constituting the program; and
calculating test values for the plurality of instructions at a plurality of time points during execution of the program by using the measured values; and
an execution-flow-verifying module that verifies the measured execution flow, under control of the processor, by comparing the test values with a reference value,
wherein, in the calculating the test values, the execution-flow-measuring module calculates each of the test values at a corresponding time point of the plurality of time points, except a test value at a first time point of the plurality of time points, by further using a test value which the execution-flow-measuring module calculates at a previous time point of the plurality of time points by using a value of a corresponding instruction among the plurality of instructions, and
wherein the plurality of instructions comprise a measurement-start instruction which instructs starting the measuring the execution flow, and a measurement-end instruction which instructs terminating the measuring the execution flow.

13. The apparatus of claim 12, wherein the execution-flow-measuring module starts the measuring the execution flow, if a measurement-start instruction is input, and terminates the measuring the execution flow, if a measurement-end instruction is input.

14. The apparatus of claim 12, wherein the execution-flow-measuring module pauses the measuring the execution flow, if a measurement-pause instruction is input.

15. The apparatus of claim 14, wherein the execution-flow-measuring module resumes the measuring the execution flow which is paused by the measurement-pause instruction, if a measurement-resumption instruction is input.

16. The apparatus of claim 12, wherein the each of the calculated test values is a checksum.

17. The apparatus of claim 16, wherein, in the calculating the test values, the execution-flow-measuring module calculates the each of the test values at the corresponding time point, including the test value at the first time point, by further using a checksum key, and
wherein the test value at the first time point is calculated by further using an initialization vector.

18. The apparatus of claim 16, wherein the plurality of time points are set according to an execution order of the plurality of instructions comprising at least one of operation, branch, jump and return.

19. The apparatus of claim 12, wherein the execution-flow-verifying module provides information that the execution flow has been performed normally, if a test value calculated at a last time point of the plurality of time points and the reference value are the same, and information indicating that the execution flow has not been normally performed, if a test value calculated at a last time point of the plurality of time points and the reference value are not the same.

20. The apparatus of claim 12, further comprising a security-processing module that decrypts the reference information which is encrypted.

* * * * *